US010839662B2

(12) United States Patent
Tezuka et al.

(10) Patent No.: US 10,839,662 B2
(45) Date of Patent: Nov. 17, 2020

(54) ALARM INFORMATION PROCESSING APPARATUS AND ALARM INFORMATION PROCESSING PROGRAM

(71) Applicant: NIHON KOHDEN CORPORATION, Tokyo (JP)

(72) Inventors: Shinji Tezuka, Tokorozawa (JP); Rie Muneshima, Tokorozawa (JP); Hiroko Hagiwara, Tokorozawa (JP); Kaoru Yamano, Tokorozawa (JP)

(73) Assignee: NIHON KOHDEN CORPORATION, Tokyo (JP)

( * ) Notice: Subject to any disclaimer, the term of this patent is extended or adjusted under 35 U.S.C. 154(b) by 0 days.

(21) Appl. No.: 16/460,073

(22) Filed: Jul. 2, 2019

(65) Prior Publication Data

US 2020/0020218 A1 Jan. 16, 2020

(30) Foreign Application Priority Data

Jul. 11, 2018 (JP) ................................ 2018-131717

(51) Int. Cl.

| | |
|---|---|
| ***G08B 21/02*** | (2006.01) |
| ***G08B 21/18*** | (2006.01) |
| ***G06F 17/18*** | (2006.01) |

(52) U.S. Cl.

CPC ............ *G08B 21/02* (2013.01); *G08B 21/18* (2013.01)

(58) Field of Classification Search

None

See application file for complete search history.

(56) References Cited

U.S. PATENT DOCUMENTS

2003/0110007 A1* 6/2003 McGee .............. G06F 11/3452 702/179

2012/0249332 A1 10/2012 Tezuka et al.

FOREIGN PATENT DOCUMENTS

JP 5624509 B2 11/2014

* cited by examiner

*Primary Examiner* — John F Mortell

(74) *Attorney, Agent, or Firm* — Pearne & Gordon LLP

(57) ABSTRACT

An alarm information processing apparatus includes: an acquirer that acquires alarm information generated in a predetermined period of time and identification information; at least one processor configured to: select first alarm information together with first identification information and second alarm information together with second identification information; and analyze statistics about the first alarm information and the second alarm information; and an output configured to output the statistics about alarms analyzed by the processor in a comparable form.

11 Claims, 12 Drawing Sheets

FIG. 4

40

| 40-1 | 40-2 | 40-3 | 40-4 | 40-5 | 40-6 | 40-7 |
|---|---|---|---|---|---|---|
| 2015/03/08 10:15 | CARDIOLOGY WARD | BED-5 | 38 | UPPER AND LOWER LIMITS OF ECG | VITAL | IDENTIFICATION INFORMATION |
| 2015/03/08 10:14 | CARDIOLOGY WARD | BED-3 | 38 | ARRYTHMIA | VITAL | IDENTIFICATION INFORMATION |
| 2015/03/08 03:39 | CARDIOLOGY WARD | BED-4 | 77 | UPPER AND LOWER LIMITS OF SpO2 | VITAL | IDENTIFICATION INFORMATION |
| | | | • | | | |
| | | | • | | | |
| 2015/03/07 02:48 | CARDIOLOGY WARD | BED-1 | 77 | PROBE CHECKING | TECHNICAL | IDENTIFICATION INFORMATION |
| 2015/03/07 21:54 | CARDIOLOGY WARD | BED-3 | 75 | UPPER AND LOWER LIMITS OF SpO2 | VITAL | IDENTIFICATION INFORMATION |
| | | | • | | | |
| | | | • | | | |

TRANSITION OF NUMBER OF ALARMS PER DAY

TRANSITION OF ALARM CANCELLATION RATIOS

TRANSITION OF OVERALL DETERMINATION

ALARM INFORMATION PROCESSING APPARATUS AND ALARM INFORMATION PROCESSING PROGRAM

CROSS-REFERENCES TO RELATED APPLICATIONS

This application is based on Japanese Patent Applications No. 2018-131717 filed on Jul. 11, 2018, the entire contents of which are incorporated herein by reference.

BACKGROUND

The presently disclosed subject matter relates to an alarm information processing apparatus and an alarm information processing program.

Japanese Patent No. 5624509 discloses an alarm information processing apparatus and an alarm information processing program, which process alarm information about alarms of patients in a facility chronologically or statistically to output an alarm report.

The alarm information processing apparatus and the alarm information processing program according to the background art may output an alarm report for a predetermined period of time in one facility, but cannot output an alarm report in comparison with another facility or other facilities, or cannot output temporal transition of the alarm report of the facility.

Therefore, the presently disclosed subject matter is to provide an alarm information processing apparatus and an alarm information processing program, which can output statistics about alarms (information about individual alarms) of one facility or in comparison with another facility or other facilities or output temporal transition of the statistics about alarms of the facility, based on alarm information (a set of information about individual alarms) of medical sites.

SUMMARY

According to an aspect of the presently disclosed subject matter, an alarm information processing apparatus includes:

an acquirer that acquires alarm information generated in a predetermined period of time and identification information;

at least one processor configured to:

- select first alarm information together with first identification information and second alarm information together with second identification information; and
- analyze statistics about the first alarm information and the second alarm information; and an output configured to output the statistics about alarms analyzed by the processor in a comparable form.

According to another aspect of the presently disclosed subject matter, an alarm information processing method includes:

acquiring alarm information generated in a predetermined period of time;

selecting first alarm information together with first identification information and second alarm information together with second identification information to thereby analyze statistics about the first alarm information and the second alarm information; and outputting the analyzed statistics about alarms in a comparable form.

According to another aspect of the presently disclosed subject matter, an alarm information processing apparatus includes:

a processor; and a memory configured to store computer readable instructions, wherein when the computer readable instructions are executed by the processor, the alarm information processing apparatus performs:

acquiring alarm information generated in a predetermined period of time;

selecting first alarm information together with first identification information and second alarm information together with second identification information to thereby analyze statistics about the first alarm information and the second alarm information; and outputting the analyzed statistics about alarms in a comparable form.

According to the alarm information processing apparatus, the alarm information processing method, and the computer readable medium in the presently disclosed subject matter, it is possible to output statistics about alarms from alarm information of medical sites.

BRIEF DESCRIPTION OF THE DRAWINGS

FIG. 4 is an example of alarm information acquired by the alarm information processing apparatus.

DETAILED DESCRIPTION OF THE EMBODIMENTS

Next, exemplary embodiments of an alarm information processing apparatus and an alarm information processing program according to the presently disclosed subject matter will be separated into [Embodiment 1] and [Embodiment 2] and described with reference to the accompanying drawings. Incidentally, in description of the drawings in the description of the presently disclosed subject matter, the same elements will be referred to by the same numbers correspondingly and respectively, and duplicate description thereof will be omitted.

Embodiment 1

The present embodiment is an embodiment which is configured so that statistics about alarms can be compared between one selected facility (own facility) and other facilities.

(Medical Configuration System)

First, a medical configuration system will be described.

Figure 1:
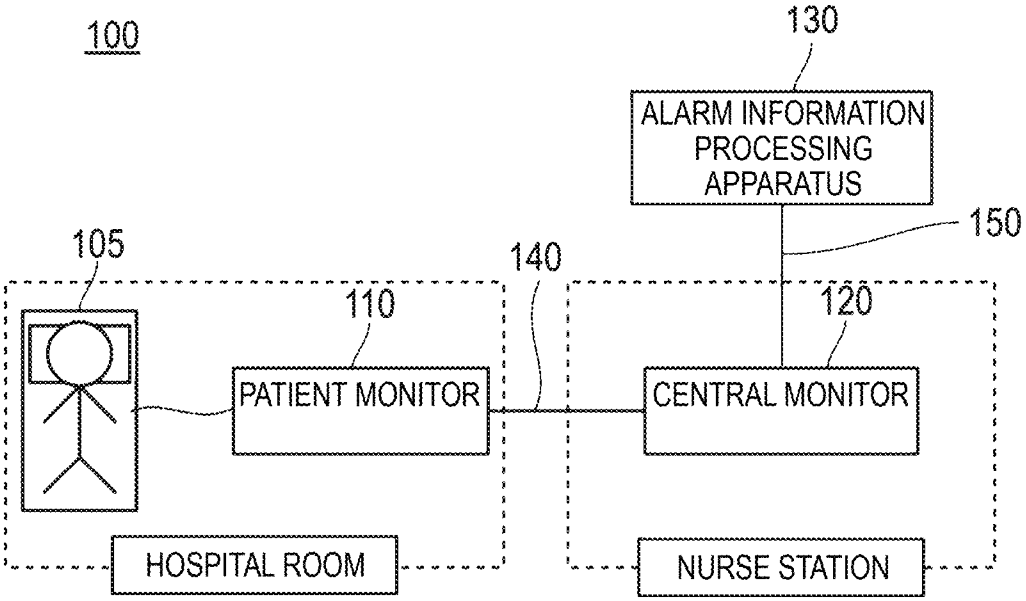
FIG. 1 illustrates a schematic configuration of a medical system of the presently disclosed subject matter.

FIG. 1 is a diagram of a schematic configuration of the medical system 100 to which the presently disclosed subject matter is applied. The medical system 100 is provided with patient monitors 110, central monitors 120, and an alarm information processing apparatus 130. The patient monitors 110 and the central monitors 120 are connected communicably with each other through communication lines 140 respectively. In addition, the central monitors 120 and the alarm information processing apparatus 130 are connected communicably with each other through communication lines 150 respectively. Each of the communication lines 140 and 150 is a communication line which can transmit vital sign information or information about an alarm (alarm information) by wire or by wireless. The communication lines 140 and 150 are formed, for example, by use of an LAN (Local Area Network) in which computers or network devices are connected based on a standard such as Ethernet (registered trademark), Token Ring or FDDI, by use of a WAN (Wide Area Network) in which LANs are connected with one another through a dedicated line, or by use of a VPN (Virtual Private Network) in which a private network is expanded in the Internet.

The patient monitors 110 are bedside monitors installed in hospital rooms. Normally, the number of the patient monitors 110 installed thus corresponds to the number of the patients received in the hospital rooms. The patient monitors 110 acquire and display vital sign information of the patients, or transmit the acquired vital sign information to the central monitors 120.

Each of the central monitors 120 is, for example, installed in a room such as a nurse station where medical staff resides. Normally, one central monitor 120 is installed in one nurse station. The central monitor 120 displays the vital sign information received from all the patient monitors 110 which are connected to the central monitor apparatus 120 through the communication lines 140, or generate an alarm on a predetermined occasion. All alarms generated by the central monitor apparatus 120 are stored as alarm information in a storage (not shown) inside the central monitor 120.

Normally, the alarm information processing apparatus 130 is constituted by a computer provided outside the apparatuses (e.g. the patient monitors 110, the central monitors 120, etc.). The computer stores an alarm information processing program according to the present embodiment. When the computer executes the alarm information processing program, the alarm information processing program can make the computer implement a function of acquiring alarm information generated in a predetermined period of time at a plurality of facilities, a function of selecting one of the facilities having the acquired alarm information and processing statistical analysis about alarms of the selected facility and alarms of another facility or other facilities, and a function of outputting the processed statistics about alarms in a comparable form. That is, due to the alarm information processing program executed by the computer, the computer can serve as the alarm information processing apparatus 130.

The alarm information processing apparatus 130 acquires alarm information from all the central monitors 120 which are connected to the alarm information processing apparatus through the communication lines 150. The alarm information processing apparatus 130 statistically processes the acquired alarm information, and outputs statistics about alarms (e.g. an alarm report). Incidentally, the statistics about alarms processed by the alarm information processing apparatus 130 may be transmitted to the central monitors 120 of each of the facilities. At each of the facilities, the transmitted statistics about alarms are displayed on a display or printed.

Figure 2:
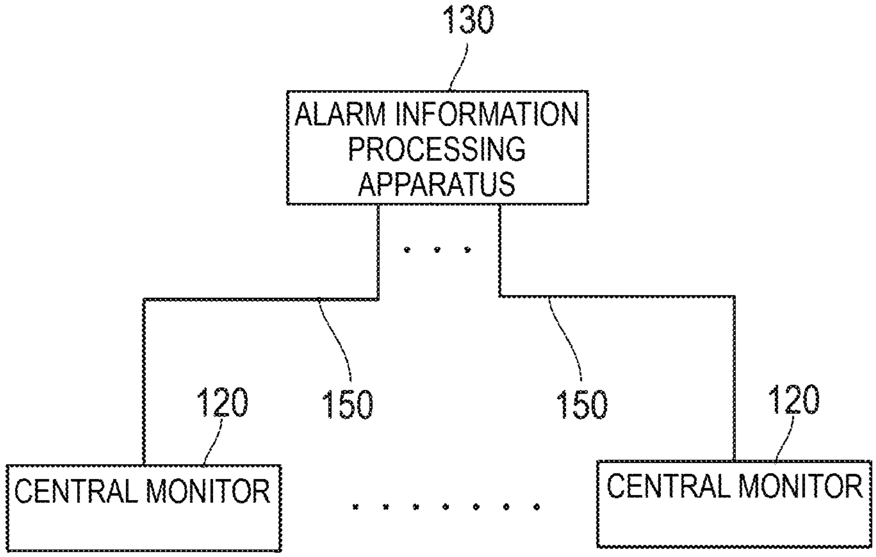
FIG. 2 is a connection diagram between central monitors and an alarm information processing apparatus in FIG. 1.

FIG. 2 is a connection diagram between the central monitors 120 and the alarm information processing apparatus 130 in FIG. 1. As illustrated in FIG. 2, the central monitors 120 are connected with the alarm information processing apparatus 130 through the communication lines 150.

Normally, one central monitor 120 is installed in one nurse station. However, a plurality of central monitors 120 may be installed in one nurse station. Not only the central monitor 120 but also a plurality of other central monitors 120 are connected with the alarm information processing apparatus 130. Accordingly, the alarm information processing apparatus 130 can acquire alarm information from one or more central monitors 120.

Identification information according to classifications such as installation region (e.g. region name such as the Kanto region, prefecture name such as Tokyo, etc.), clinic department classification (e.g. special field name such as surgical department or internal department), facility scale (e.g. average patient number, staff number, bed number, etc.), facility name (e.g. Hospital name, Ward name, etc.), instrument in use (e.g. central monitor model, version, etc.) and facility operation classification (e.g. team name etc.) are allocated to the central monitors 120 connected with the alarm information processing apparatus 130. When alarm information is outputted from each central monitor 120 to the alarm information processing apparatus 130, those identification information allocated to the central monitor 120 are given to the alarm information. Accordingly, the alarm information processing apparatus 130 can, for example, process the statistics about alarms of the own facility and alarms of the other facilities for each classification, for example, for each installation region, for each clinic department classification, for each facility scale, for each facility or for each combination thereof.

More specifically, the alarm information processing apparatus 130 can process monthly statistics about alarms of the own facility, which is, for example, an internal department with an average number of 100 to 200 patients in a given Hospital, and monthly statistics about alarms of the other facilities, which are internal departments with an average number of 1000 to 2000 patients in all hospitals of all regions. The example does not limit the scope of the presently disclosed subject matter.

Figure 3:
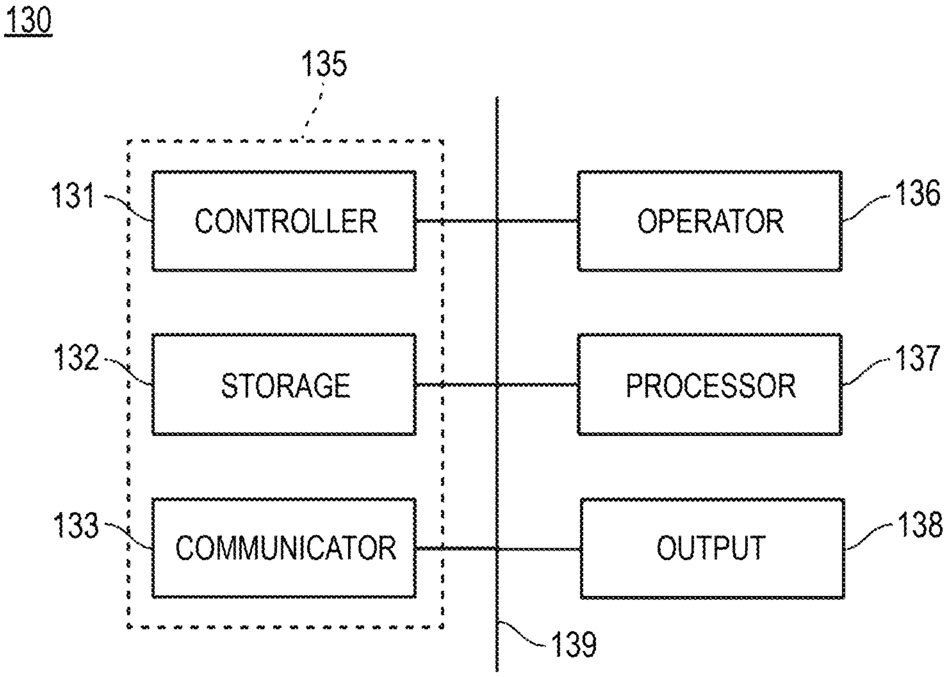
FIG. 3 is a block diagram illustrating a schematic configuration of the alarm information processing apparatus.

FIG. 3 is a block diagram illustrating a schematic configuration of the alarm information processing apparatus 130. As shown in FIG. 3, the alarm information processing apparatus 130 may include a controller 131, one or more storage 132, a communicator 133, an operator 136, one or more processor 137, and an output 138. These constituent elements are connected with one another through a bus 139. Incidentally, the controller 131, the storage 132 and the communicator 133 constitute an acquirer 135.

The controller 131 is mainly constituted by one or more CPU (Central Processing Unit) to thereby control the aforementioned constituent elements with which the controller 131 is connected through the bus 139 or execute various processing processes in accordance with a program.

The storage 132 is constituted by one or more ROM (Read Only Memory) storing various programs or various data in advance, one or more RAM (Random Access Memory) serving as a working area to store programs or data temporarily, a hard disk storing various programs or various data, etc. The alarm information processing program according to the present embodiment is stored in the ROM, and all the alarm information acquired from the central monitors 120 are stored in the RAM or the hard disk.

The communicator 133 serves as an interface for receiving the alarm information from all the central monitors 120 or transmitting the statistics about alarms processed by all the central monitors 120.

As described above, the controller 131, the storage 132 and communicator 133 constitute the acquirer 135. However, the acquirer 135 has a function of acquiring alarm information generated in a predetermined period of time (e.g. one month) at the own facility and the other facilities.

The operator 136 is constituted by a keyboard, a touch panel, etc. to thereby accept various operations from a user. Through the operator 136, the user can designate the output form with which the processed statistics about alarms should be outputted. For example, the statistics about alarms can be designated to be processed for each classification, for example, for each facility installation region, for each clinic department classification, for each facility scale, for each facility, etc.

The processor 137 is mainly constituted by a CPU in a similar manner to or the same manner as the controller 131. The processor 137 processes the statistics about alarms of the own facility and the other facilities from the alarm information acquired by the acquirer 135. Specifically, the processor 137 processes the statistics about alarms designated by the operator 136 from the alarm information stored in the storage 132.

The output 138 displays the alarm information stored in the storage 132 or the statistics about alarms processed by the processor 137 on a display, or prints the same alarm information or the same statistics about alarms by a printer.

According to the alarm information processing apparatus and the alarm information processing program configured in the aforementioned manner according to the present embodiment, it is possible to output statistics about alarms from alarm information of medical sites.

(Operation of Medical System)

Next, the outline of operation of the medical system 100 will be described.

Each of the patient monitors 110 measures various vital sign information of a patient 105 (see FIG. 1). The vital sign information measured by the patient monitor 110 includes an electrocardiogram (ECG), arterial oxygen saturation (SpO2), invasive blood pressure (IBP), non-invasive blood pressure (NIBP), respiration (RESP), amounts of carbon dioxide (CO2) in inspired air and exhaled air, etc.

For example, the patient monitor 110 measuring the ECG detects abnormality about arrhythmia or upper and lower limits of a heart rate (HR) as a vital alarm indicating physiological abnormality. In addition, the patient monitor 110 detects technical abnormality of a medical instrument as a technical alarm, for example, when there is noise intrinsic in a measurement signal or when there is no signal from at least one electrode. On the other hand, the patient monitor apparatus 110 measuring the SpO2 detects abnormality about the SpO2 or upper and lower limits of a plus rate (PR), as a vital alarm. In addition, when a signal or pulses cannot be received normally from a probe attached to the patient 105, the patient monitor 110 detects such abnormality as a technical alarm. Thus, an alarm indicating abnormality of the vital sign information of the patent 105 is a vital alarm, and an alarm indicating abnormality of the medical instrument acquiring the vital sign information is a technical alarm. Such vital sign information may be measured invasively or non-invasively.

When abnormality is detected, the patient monitor 110 generates an alarm. As to the alarm, there are three kinds of alarms, i.e. a low priority alarm lowest in degree of treatment emergency, a middle priority alarm higher in degree of treatment emergency than the low priority alarm, and a high priority alarm highest in degree of treatment emergency. Information about the abnormality causing the alarm is stored as alarm information in the patient monitor 110. Simultaneously, the alarm information is transmitted to the central monitor 120 through the communication line 140. The central monitor apparatus 120 acquires such alarm information from one or more patient monitors 110 connected to the communication line or lines 140, and stores the acquired alarm information.

FIG. 4 is an example of the alarm information stored by the central monitor 120. As shown in FIG. 4, the alarm information 40 includes alarm contents 40-1 to 40-6 etc., and identification information 40-7. The alarm information 40 are arranged in lines and in chronological order, as shown in FIG. 4, and stored in the central monitors 120.

The alarm content 40-1 indicates a time instant at which the alarm was generated. The time instant may be stored on a time scale of up to seconds. The alarm content 40-2 indicates a place where the alarm was generated. As shown in FIG. 4, the alarm information can be acquired from different patient monitors 110 at different places. The alarm content 40-3 indicates identification information of a bed of the patient 105 who caused the alarm.

The alarm content 40-4 indicates a measurement value of vital sign information measured by the patient monitor 110. The alarm content 40-5 indicates an alarm content corresponding to abnormality of the vital sign information detected by the patient monitor 110. For example, information such as “arrhythmia” and “upper and lower limits of a heart rate (HR)” etc. is included as the alarm content relevantly to the ECG serving as one parameter. In addition, information such as “upper and lower limits of SpO2” and “upper and lower limits of PR” is included as the alarm content relevantly to the SpO2. In addition, information such as upper and lower limits of parameters of IBP, NIBP, RESP and CO2 is included as the alarm contents relevantly to the parameters respectively. The alarm content 40-6 indicates which the generated alarm relates to, abnormality of the vital sign information or technical abnormality, and indicates which the alarm belongs to, the aforementioned type of vital alarm or the aforementioned type of technical alarm.

Incidentally, information indicating “unanalyzable” and “check electrodes” is included in the alarm content as the technical alarm related to the ECG, or information indicating “check probe”, “inability to detect pulses” and “external light noise” is included in the alarm content as the technical alarm related to the SpO2. In addition, of the technical alarm, a content indicating “interruption of radio waves” etc.

may be included as an irrelevant content to any of the parameters. Further, information indicating a time between generation of the alarm and silence of the alarm, whether the alarm was silenced by medical staff or not, etc. may also be included in the alarm information.

The identification information 40-7 are allocated in accordance with the installation regions, the clinical department classifications, the facility scales and the facilities of the central monitors 120. When transmitting the stored alarm information 40 to the alarm information processing apparatus 130, the central monitors 120 add, to alarm information 40, the identification information 40-7 allocated in accordance with the installation regions, the clinic department classifications, the facility scales, the facilities, etc. The alarm information processing apparatus 130 acquires the alarm information 40 added with the identification information 40-7 from all the central monitors 120 connected to the alarm information processing apparatus 130.

The alarm information processing apparatus 130 processes the statistics about alarms of the facilities from the alarm information 40 acquired from the central monitors 120, and outputs an alarm report.

(Operations of Alarm Information Processing Apparatus)

Figure 5:
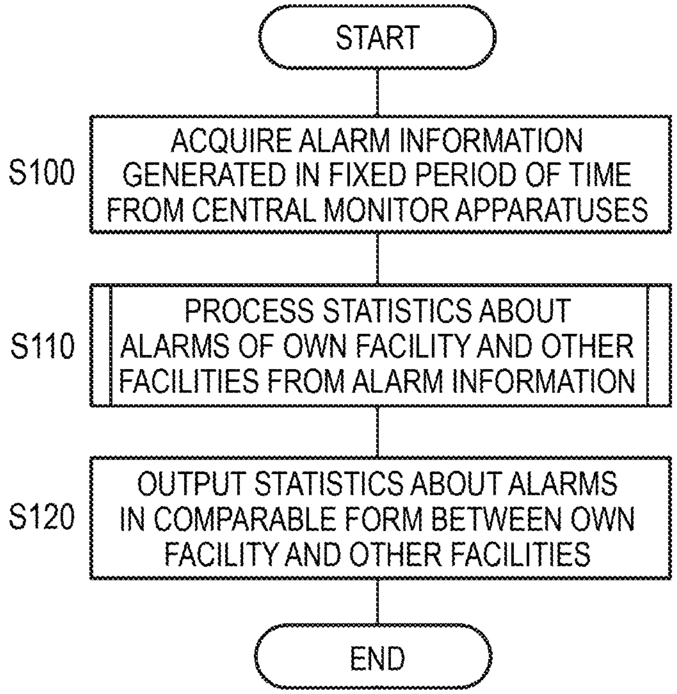
FIG. 5 is an operation flow chart of the alarm information processing apparatus in Embodiment 1.

Next, specific operations of the alarm information processing apparatus 130 will be described. FIG. 5 is an operation flow chart of the alarm information processing apparatus 130 in Embodiment 1. The operation flow chart is also an execution procedure of the alarm information processing program processed inside the alarm information processing apparatus 130 according to the present embodiment.

The acquirer 135 illustrated in FIG. 3 acquires alarm information 40 generated in a predetermined period of time at a plurality of facilities (S100). Specifically, the communicator 133 illustrated in FIG. 3 communicates with all central monitors 120 connected with the alarm information processing apparatus 130 by wire or by wireless, and receives the alarm information 40 generated in the predetermined period of time illustrated in FIG. 4, together with pieces of identification information 40-7. All alarm information 40 received thus are stored together with the pieces of identification information 40-7 in the storage 132. The operation of making the communicator 133 receive the alarm information 40 and the operation of making the storage 132 store the alarm information 40 are controlled by the controller 131.

Next, the processor 137 illustrated in FIG. 3 selects one facility having the alarm information 40 acquired by the acquirer 135, and processes statistics about alarms of the selected facility (own facility) and other facilities (S110). Specifically, the processor 137 illustrated in FIG. 3 extracts alarm information designated by the operator 136 from the storage 132, and processes statistics about alarms in an output form designated by the operator 136. The statistics about alarms are processed, for example, in a comparable form between the own facility and the other facilities, for example, in accordance with each installation region, each clinic department classification, each facility scale, each facility, etc. Specific processing of the statistics about alarms will be described later by use of a flow chart in FIG. 6.

Next, the output 138 shown in FIG. 3 outputs the statistics about alarms processed by the processor 137 in the comparable form between the own facility and the other facilities. Incidentally, the operation of making the processor 137 process the statistics about alarms and the operation of making the output 138 output the statistics about alarms are controlled by the controller 131. Specific output forms of the statistics about alarms will be described later by use of FIG. 7 to FIG. 11.

Figure 6:
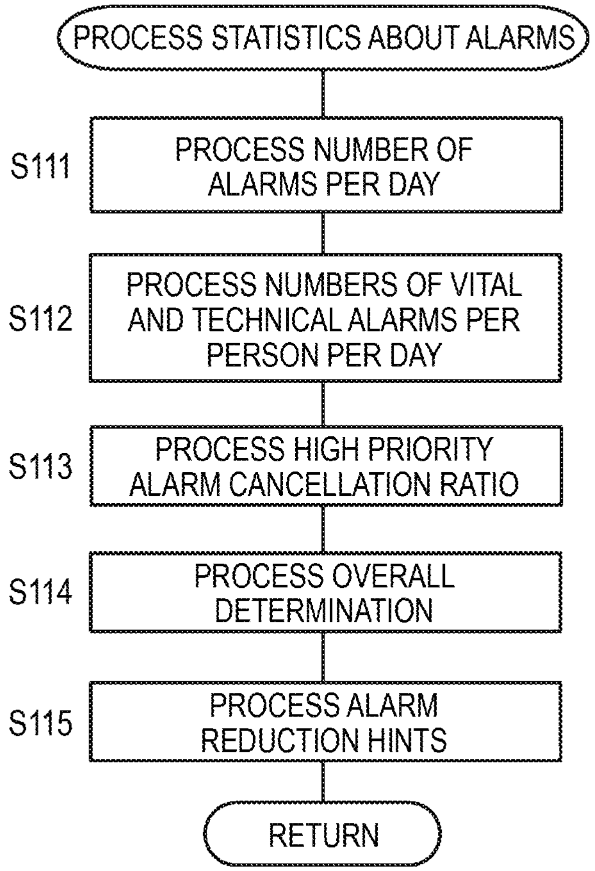
FIG. 6 is a subroutine flow chart of S110 in FIG. 5.

FIG. 6 is a subroutine flow chart of S110 in FIG. 5. The operator 137 processes numbers of alarms per day of all the central monitors 120 connected with the alarm information processing apparatus 130, from the alarm information stored in the storage 132. Each of the numbers of alarms is a total of a number of vital alarms and a number of technical alarms. The number of alarms may be divided and processed into the number of vital alarms and the number of technical alarms per day (S111).

Next, the processor 137 processes the numbers of vital alarms and the numbers of technical alarms per person per day of all the central monitors 120 connected with the alarm information processing apparatus 130, from the alarm information stored in the storage 132 (S112).

Further, the processor 137 picks up high priority alarms from three types of alarms, i.e. high priority alarms, middle priority alarms, and low priority alarms, which are included in the alarm information stored in the storage 132, so as to calculate a silence ratio of the high priority alarms (a high priority alarm silence ratio) indicating a ratio with which the high priority alarms were silenced by medical staff. The high priority alarm silence ratio is obtained by processing (the number of silenced high priority alarms/the number of generated high priority alarms) (S113). Although only the high priority alarm silence ratio is calculated in the present embodiment, a middle priority alarm silence ratio or a low priority alarm silence ratio may be processed additionally.

Further, the processor 137 processes overall determination of the own facility by using the number of alarms per day, the number of alarms per person per day, and the alarm silence ratio (S114). The overall determination is performed by processing a radar chart with four items, i.e. "environment", "setting", "response" and "management". The "environment" is an item of evaluation based on the number of alarms per day. The "setting" is an item of evaluation about validity of a threshold set in order to generate an alarm. The "response" is an item of evaluation about how often the medical staff silenced an alarm when the alarm generated. The "management" is an item of evaluation based on the number of technical alarms per person per day.

Finally, the processor 137 processes alarm reduction hints by itemizing the number of alarms per person per day in accordance with causes of the alarms, and arranging the itemized numbers of alarms in descending order. Specifically, the hints for reducing the number of alarms include the number of vital alarms and the number of technical alarms for each cause, and a ratio of each of the numbers of alarms for each cause to the number of alarms per person per day (S115).

As described above, the number of alarms per day (per predetermined period of time), the number of alarms per person per day (per predetermined number of persons per predetermined period of time) and the alarm silence ratio are processed as the statistics about alarms in the present embodiment. Incidentally, although the three numbers, i.e. the number of alarms per day, the number of alarms per person per day, and the alarm silence ratio are processed in the present embodiment, at least one of the three numbers may be processed alternatively. In addition, the predetermined period of time is mentioned as one day by way of example. The predetermined period of time is not limited thereto but may be working hours for day shift and night shift, one week, 15 days, etc. In addition, the predetermined number of persons is mentioned as one by way of example but may be plural.

According to the present embodiment, it is possible to process how many alarms are generated per day at each facility, how many alarms are generated per person per day, and how high the alarm silence ratio is, as the statistics about alarms.

In addition, the number of alarms per day or the number of alarms per person per day includes the number of vital alarms each indicating abnormality of vital sign information of a patient 105, the number of technical alarms each indicating trouble of a medical instrument acquiring the vital sign information of the patient 105, and the total of the number of vital alarms and the number of technical alarms.

According to the present embodiment, the number of vital alarms or the number of technical alarms per day can be processed, and the number of vital alarms or the number of technical alarms per person per day can be processed. Accordingly, the statistics about alarms can be obtained minutely.

Incidentally, the alarm silence ratio may include a silence ratio of the low priority alarm lowest in degree of treatment emergency, a silence ratio of the middle priority alarm higher in degree of treatment emergency than the low priority alarm, and a silence ratio of the high priority alarm highest in degree of treatment emergency. Accordingly, the statistics about the alarm silence ratio can be obtained minutely.

In the present embodiment, the overall determination of the own facility is processed in comparison with the other facilities. Accordingly, it is possible to easily grasp points of improvement of alarm management in the own facility.

In the present embodiment, the hints for reducing the number of alarms of the own facility are processed so as to include the numbers of the vital alarms and the technical alarms for each cause, and the ratio of each of the numbers of alarms for each cause to the number of alarms per person per day. Therefore, it can be made clear what should be done in order to reduce the number of alarms.

Next, output forms of the number of alarms per day, the numbers of vital and technical alarms per person per day, the high priority alarm silence ratio, the overall determination, and the hints for reducing the number of alarms, which are obtained by the process of the subroutine flow chart of FIG. 6, will be described. The statistics about alarms are outputted as an alarm report by the output 138. The alarm report may be displayed on a display or printed by a printer.

Figure 7:
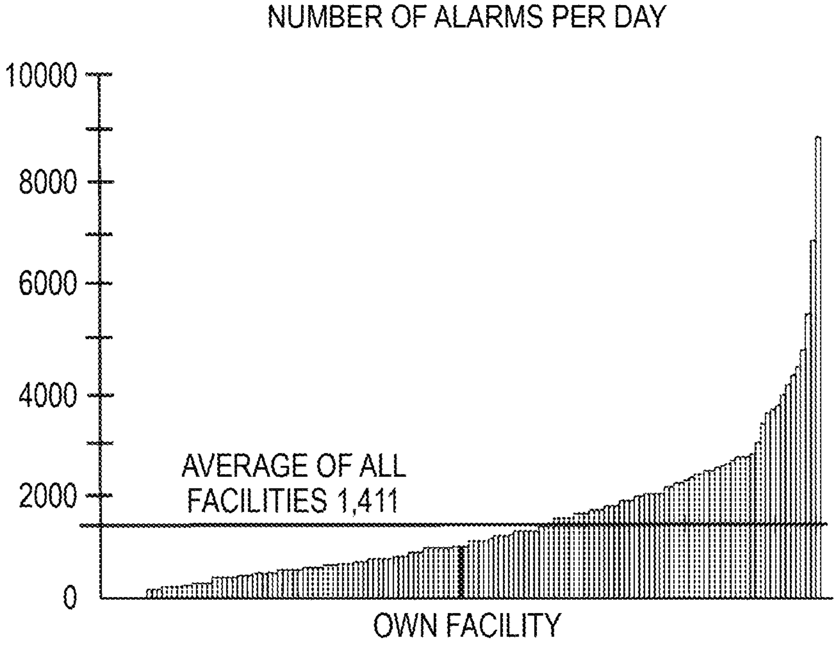
FIG. 7 illustrates an output form of "the number of alarms per day" outputted by an output.

FIG. 7 is an output form of the "number of alarms per day" outputted by the output 138. As for the number of alarms per day, a bar graph is displayed in which bars indicating numbers of alarms in facilities respectively are arranged from a left side of the abscissa toward a right side thereof and in descending order of the numbers of alarms per day in the facilities. A color of the bar for the own facility in the bar graph is arranged to be different from a color of the bars for the other facilities in the bar graph so that the position of the bar for the own facility in the bar graph can be known. In addition, an average value of the numbers of alarms per day in all the facilities is displayed by a straight line. By the display made in this manner, it is possible to know whether the number of alarms per day in the own facility is larger or smaller than the average value and know where the own facility is positioned relatively to the other facilities.

Figure 8:
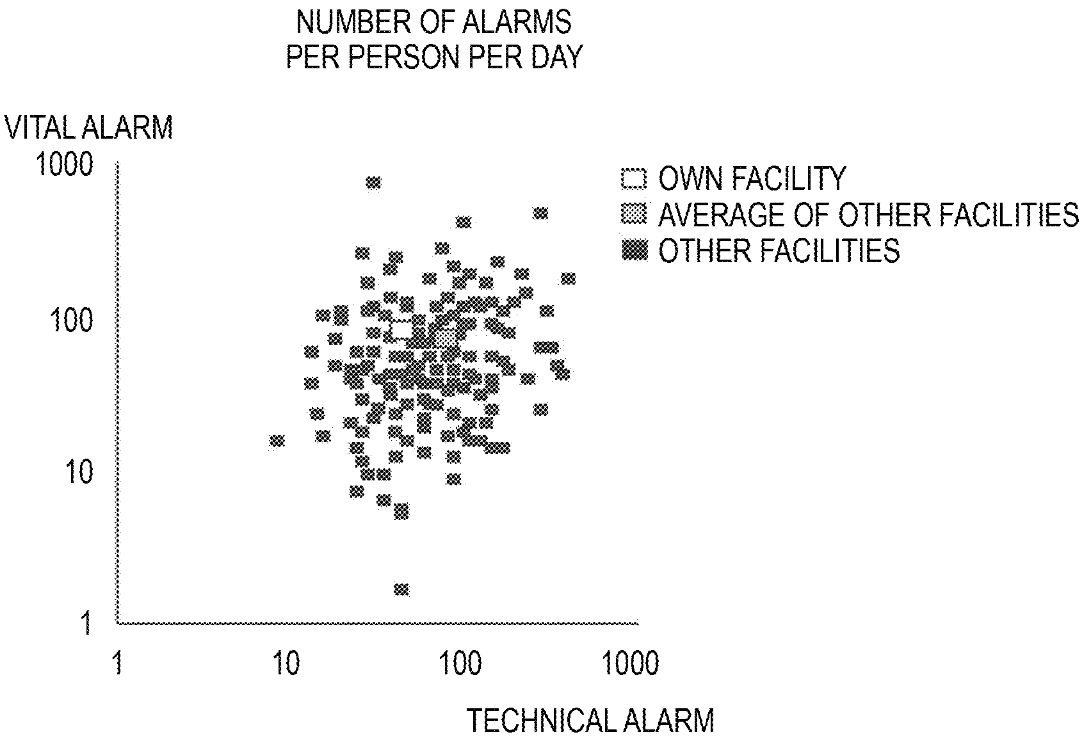
FIG. 8 illustrates an output form of "the number of alarms per person per day" outputted by the output.

FIG. 8 is an output form of the "number of alarms per person per day" outputted by the output 138. The number of alarms is classified into a number of vital alarms and a number of technical alarms. The number of vital alarms is set on the ordinate, and the number of technical alarms is set on the abscissa. The number of alarms per person per day is displayed in such a manner that the numbers of vital alarms of the facilities and the numbers of technical alarms of the facilities are plotted on a plane. An average of all the facilities is also plotted and displayed on the plane. A plot color for a plot position of the own facility is arranged to be different from a plot color for plot positions of the other facilities so that the plot position of the own facility can be known. In addition, a plot color for a plot position of the average of all the facilities may be also different from the plot colors for the own facility and the other facilities so that the relative positions of the plot of the own facility and the plots of the other facilities to the plot position of the average of all the facilities can be known. By the display made in this manner, it is possible to know whether the number of vital alarms and the number of technical alarms per person per day of the own facility are larger or smaller than the averages and know where the own facility is positioned relatively to the other facilities.

Figure 9:
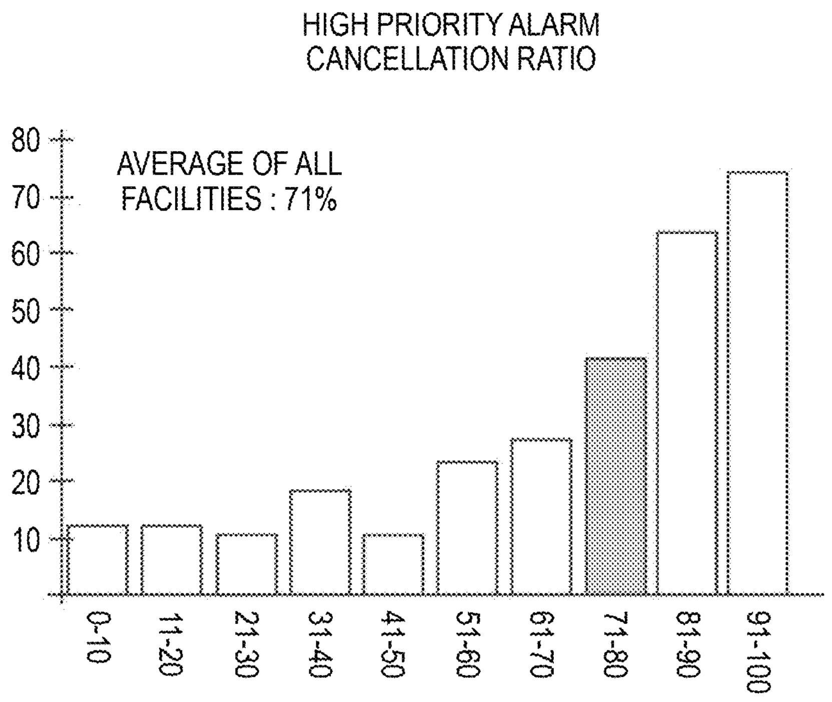
FIG. 9 illustrates an output form of a "high priority alarm silence ratio" outputted by the output.

FIG. 9 is an output form of the "high priority alarm silence ratio" outputted by the output 138. The high priority alarm silence ratio (%) is divided into ten segments, i.e. 0-10, 11-20, 21-30, 31-40, 41-50, 51-60, 61-70, 71-80, 81-90 and 91-100, and numbers of facilities in the segments corresponding to the silence ratios are displayed by bars in a bar graph respectively. A color for the bar of the segment corresponding to the high priority alarm silence ratio of the own facility in the bar graph is arranged to be different from a color for bars of the other facilities in the bar graph so that a position of the bar of the own facility in the bar graph can be known. In addition, an average of the high priority alarm silence ratios of all the facilities is also displayed. By the display made in this manner, it is possible to know whether the high priority alarm silence ratio of the own facility is larger or smaller than those of the other facilities and know where the own facility is positioned relatively to the other facilities.

Figure 10:
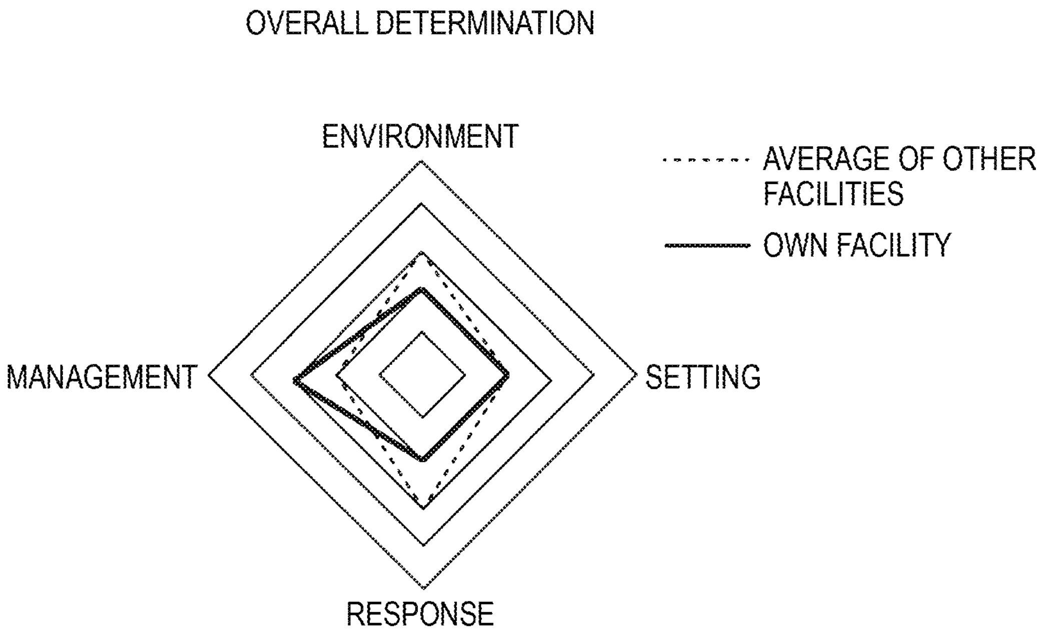
FIG. 10 is a chart illustrating an output form of "overall determination" outputted by the output.

FIG. 10 is an output form of the "overall determination" outputted by the output 138. The overall determination is displayed by a radar chart with four items "environment", "setting", "response", and "management". The overall determination is performed by five-level evaluation, and each threshold is provided between adjacent ones of the levels. The overall determination is evaluated as more excellent as an area of a square formed by connecting the evaluation levels of the four items is larger. As a result of the overall determination, a comment "Evaluation of response of the own facility is lower than an average of the other facilities. There is a possibility that response of the own facility to the high priority alarm may be insufficient" is displayed on a screen.

The "environment" is evaluated based on the number of alarms per day. The "environment" is evaluated as more excellent as the number of alarms per day is smaller. As the number of alarms per day is large, the environment of the facility is deteriorated because of the large number of the alarms generating. Accordingly, a facility which has a larger number of alarms per day is plotted on a point closer to the center in the radar chart.

The "setting" is evaluated based on the number of vital alarms per person per day. The "setting" is evaluated as more excellent as the number of vital alarms per person per day is smaller. It is because that, when the number of vital alarms per person per day is large, for example, there are a large number of cases in each of which a set value of the vital alarm for vital sign information such as a heart rate is unsuitable for a patient's condition. Accordingly, by referring to the evaluation of the "setting", it is possible to know whether the set value of the vital alarm is suitable or not, so that it is possible to provide an opportunity to change the set value.

The "response" is evaluated based on how often the medical staff silenced the alarm, i.e. an alarm silence ratio, when the alarm generated. The "response" is evaluated as more excellent as the alarm silence ratio is higher. In the present embodiment, the "response" is evaluated by the high priority alarm silence ratio. When the high priority alarm generated, the medical staff immediately responds to a patient 105 and pushes a silence button of the high priority alarm. By referring to the evaluation of the "response", it is possible to grasp whether the number of nurses is sufficient or not, whether generation of the high priority alarm is too often or not, etc.

The "management" is evaluated based on the number of technical alarms per person per day. The "management" is evaluated as more excellent as the number of technical alarms per person per day is smaller. When the number of technical alarms per person per day is large, it means a large number of cases in each of which a measurement state or a communication state is not managed well, for example, an electrode comes off a patient 105, a sensor comes off a finger of the patient 105, or wireless radio waves constituting a communication line 140 are interrupted. Accordingly, by referring to the evaluation of the "management", it is possible to provide an opportunity for making an improvement to prevent the electrode or the sensor from coming off so that the measurement state can be better or for improving the communication device.

Figure 11:
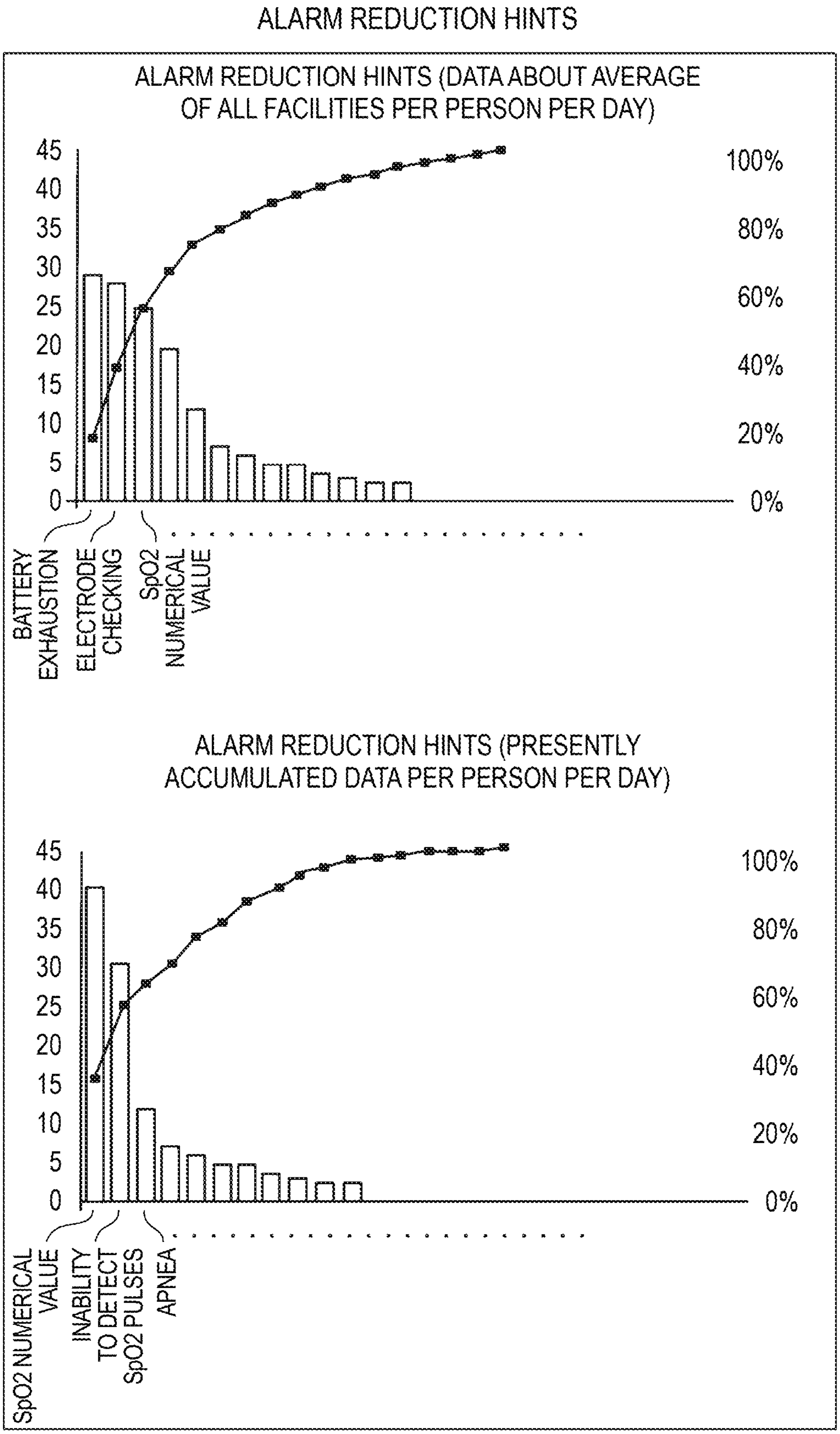
FIG. 11 is a view illustrating an output form of "alarm reduction hints" outputted by the output.

FIG. 11 is an output form of the "alarm reduction hints" outputted by the output 138. The upper half part in FIG. 11 for the alarm reduction hints includes a bar graph and a line graph illustrating average data of the numbers of vital and technical alarms per person per day in all the facilities. The bars in the bar graph illustrating numbers of alarms for respective items respectively are arranged in descending order. The line graph illustrates the cumulative percentages of the numbers of alarms for the items. The lower half part in FIG. 11 includes a bar graph and a line graph illustrating the numbers of vital and technical alarms per person per day in the own facility. The bars in the bar graph illustrating numbers of alarms for respective items respectively are arranged in descending order. The line graph illustrates the cumulative percentages of the numbers of alarms for the items. When the two bar graphs and the two line graphs are compared with each other, it can be made clear what should be improved at the own facility.

In the upper half part of FIG. 11, as the average number of alarms per person per day in all the facilities, the number of technical alarms indicating battery exhaustion is largest, and the number of technical alarms indicating electrode checking is second largest. In the lower half part of FIG. 11, as the number of alarms per person per day in the own facility, the number of vital alarms indicating abnormality of an SpO2 numerical value is largest, and the number of technical alarms indicating inability to detect SpO2 pulses is second largest. By viewing FIG. 11, it can be known that the own facility has large numbers of vital alarms and technical alarms about SpO2, that is, large numbers of alarms in different items from those in the other facilities. It is possible to predict that the number of alarms can be reduced as long as a countermeasure is taken to reduce the numbers of vital alarms and technical alarms about measurement of SpO2 in this case. Thus, based on the alarm reduction hints, it can be made clear which alarm should be first improved at the own facility.

In the present embodiment, as described above, statistics about alarms are outputted in any of the output forms shown in FIG. 7 to FIG. 11. Accordingly, the own facility can be compared with the other facilities so that it is possible to grasp which medical behavior should be improved at the own facility. Incidentally, the output forms shown in FIG. 7 to FIG. 11 are exemplified. Various output forms other than these examples can be used as ways to present the statistics about alarms. For example, it is possible to consider various output forms such as an output form in which the own facility can be compared with another facility or other facilities in the same region as the own facility, and an output form in which the own facility can be compared with another facility or other facilities having the same scale as the own facility.

Embodiment 2

The embodiment 2 is configured so that temporal transition of statistics about alarms of an own facility can be outputted.

In the present embodiment, a schematic configuration of a medical system 100, connection between central monitors 120 and an alarm information processing apparatus 130, a schematic configuration of the alarm information processing apparatus 130, and alarm information 40 acquired by the alarm information processing apparatus 130 are the same as those described above in Embodiment 1. In the present embodiment, functions of the alarm information processing apparatus 130 are different from those in Embodiment 1.

The alarm information processing apparatus 130 of the embodiment 2 can process temporal transition of statistics about alarms in the own facility, differently from the alarm information processing apparatus 130 of the embodiment 1. Specifically, the alarm information processing apparatus 130 can, for example, process monthly transition of statistics about alarms for one year about the internal department with an average number of 100 to 200 patients in a given Hospital, which is the own facility. The example does not limit the scope of the presently disclosed subject matter.

The alarm information processing apparatus 130 of the embodiment 2 is constituted by a computer normally provided outside the facilities. The computer stores an alarm information processing program of the embodiment 2. The alarm information processing program of the embodiment 2 can make the computer implement a function of acquiring alarm information generated for each period of time at the own facility, a function of processing statistics about alarms for each predetermined period of time from the acquired alarm information, and a function of outputting the processed statistics about alarms for each predetermined period of time in a comparable form. That is, when the alarm information processing program is executed by the computer, the computer can serve as the alarm information processing apparatus 130.

In addition, the alarm information processing apparatus 130 according to the embodiment 2 can include an acquirer 135, one or more processor 137, and an output 138 which have different functions from those according to Embodiment 1 (see FIG. 3). The acquirer 135 acquires the alarm information generated for each predetermined period of time at the own facility. The processor 137 processes the statistics about alarms for each predetermined period of time from the alarm information 40 acquired by the acquirer 135. The output 138 outputs the statistics about alarms processed by the processor 137 for each predetermined period of time in the comparable form.

(Operation of Alarm Information Processing Apparatus)

Figure 12:
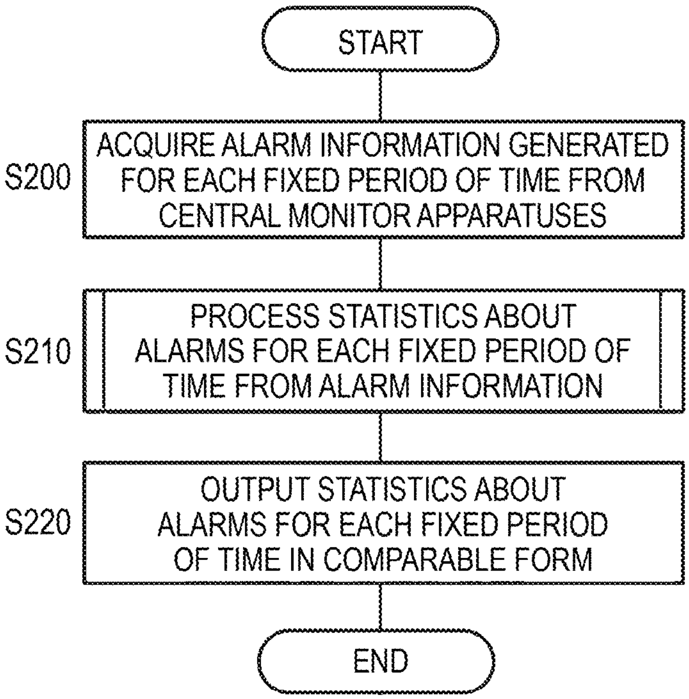
FIG. 12 is an operation flow chart of an alarm information processing apparatus in Embodiment 2.

Next, specific operations of the alarm information processing apparatus 130 will be described. FIG. 12 is an operation flow chart of the alarm information processing apparatus 130 in Embodiment 2. The operation flow chart is also an execution procedure of the alarm information processing program processed inside the alarm information processing apparatus 130 according to the embodiment 2.

The acquirer 135 shown in FIG. 3 acquires alarm information 40 generated for each predetermined period of time from the central monitors 120 (S200). Specifically, a communicator 133 shown in FIG. 3 communicates with the central monitors 120 in the own facility, and receives the alarm information 40 generated for each predetermined period of time together with identification information 40-7, as shown in FIG. 4. All the received alarm information 40 are stored together with the pieces of identification information 40-7 in one or more storage 132. The operation of making the communicator 133 receive the alarm information 40 and the operation of making the storage 132 store the alarm information 40 are controlled by a controller 131.

Next, from the alarm information 40 acquired by the acquirer 135, the processor 137 shown in FIG. 3 processes statistics about alarms in the own facility for each predetermined period of time (S210). Specifically, the processor 137 shown in FIG. 3 extracts, from the storage 132, corresponding alarm information within a period of time designated by an operator 136, and processes statistics about alarms into a form designated by the operator 136. The statistics about alarms are processed, for example, in a form in which monthly transition of the statistics about alarms in the own facility can be compared. Specific processing of the statistics about alarms will be described later by use of a flow chart of FIG. 13.

Next, the output 138 shown in FIG. 3 outputs the statistics about alarms processed by the processor 137 for each predetermined period of time in the comparable form. Incidentally, the operation of making the processor 137 process the statistics about alarms and the operation of making the output 138 output the statistics about alarms are controlled by the controller 131. Specific output forms of the statistics about alarms will be described later by use of FIG. 14 to FIG. 18.

Figure 13:
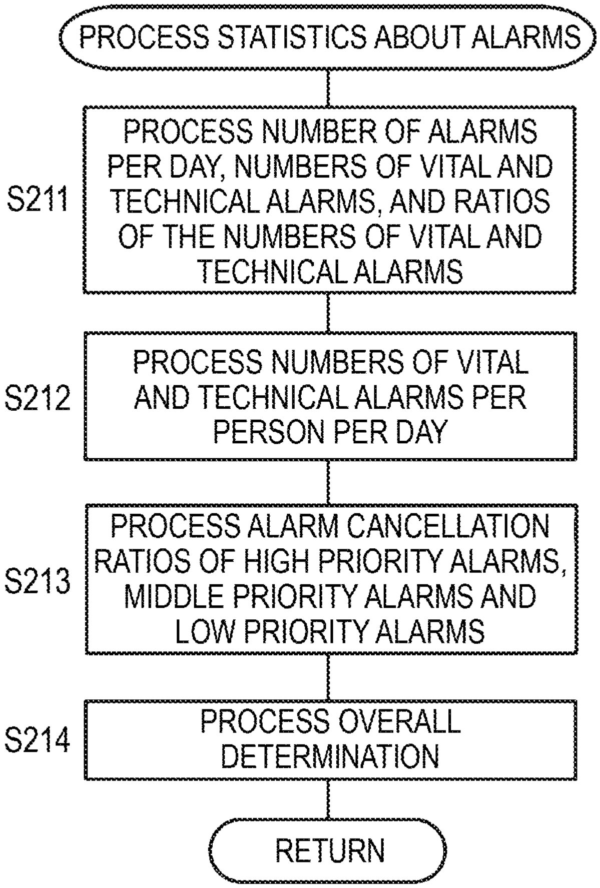
FIG. 13 is a subroutine flow chart of S210 of FIG. 12.

FIG. 13 is a subroutine flow chart of S210 in FIG. 12. The processor 137 processes a number of alarms per day, numbers of vital and technical alarms, ratios of the numbers of the vital and technical alarms with respect to the number of alarms per day, from the alarm information stored in the storage 132 (S211).

Next, the processor 137 processes numbers of vital and technical alarms per person per day of the central monitors 120 in the own facility, from the alarm information stored in the storage 132 (S212).

Further, the processor 137 processes alarm silence ratios of high priority alarms, middle priority alarms and low priority alarms which are included in the alarm information stored in the storage 132. That is, the processor 137 respectively processes the high priority alarm silence ratio indicating a ratio with which the high priority alarms were silenced by medical staff, the middle priority alarm silence ratio indicating a ratio with which the middle priority alarms were silenced by the medical staff, and the low priority alarm silence ratio indicating a ratio with which the low priority alarms were silenced by the medical staff (S213).

Further, the processor 137 processes overall determination of the own facility by use of the number of alarms per day, the numbers of vital and technical alarms, the ratios of the numbers of vital and technical alarms with respect to the number of alarms per day, the numbers of vital and technical alarms per person per day, the high priority alarm silence ratio, the middle priority alarm silence ratio and the low priority alarm silence ratio (S214). The overall determination is performed by processing a radar chart with four items of "environment", "setting", "response" and "management". The "environment" is an item of evaluation based on the number of alarms per day. The "setting" is an item of evaluation about validity of a threshold from the number of vital alarms per person per day. The "response" is an item of evaluation about how frequently the medical staff silenced an alarm when the alarm generated. The "management" is an item of evaluation based on the number of technical alarms per person per day.

Next, output forms of transition of the number of alarms per day, transition of the numbers of vital and technical alarms, transition of the ratios of the numbers of vital and technical alarms with respect to the number of alarms per day, transition of the numbers of vital and technical alarms per person per day, transition of the high priority alarm silence ratio, transition of the middle priority alarm silence ratio, and transition of the low priority alarm silence ratio and transition of the overall determination, which are obtained by the process of the subroutine flow chart of FIG. 13 will be described. These statistics about alarms are outputted as an alarm report by the output 138. The alarm report may be displayed on a display or may be printed by a printer.

Figure 14:
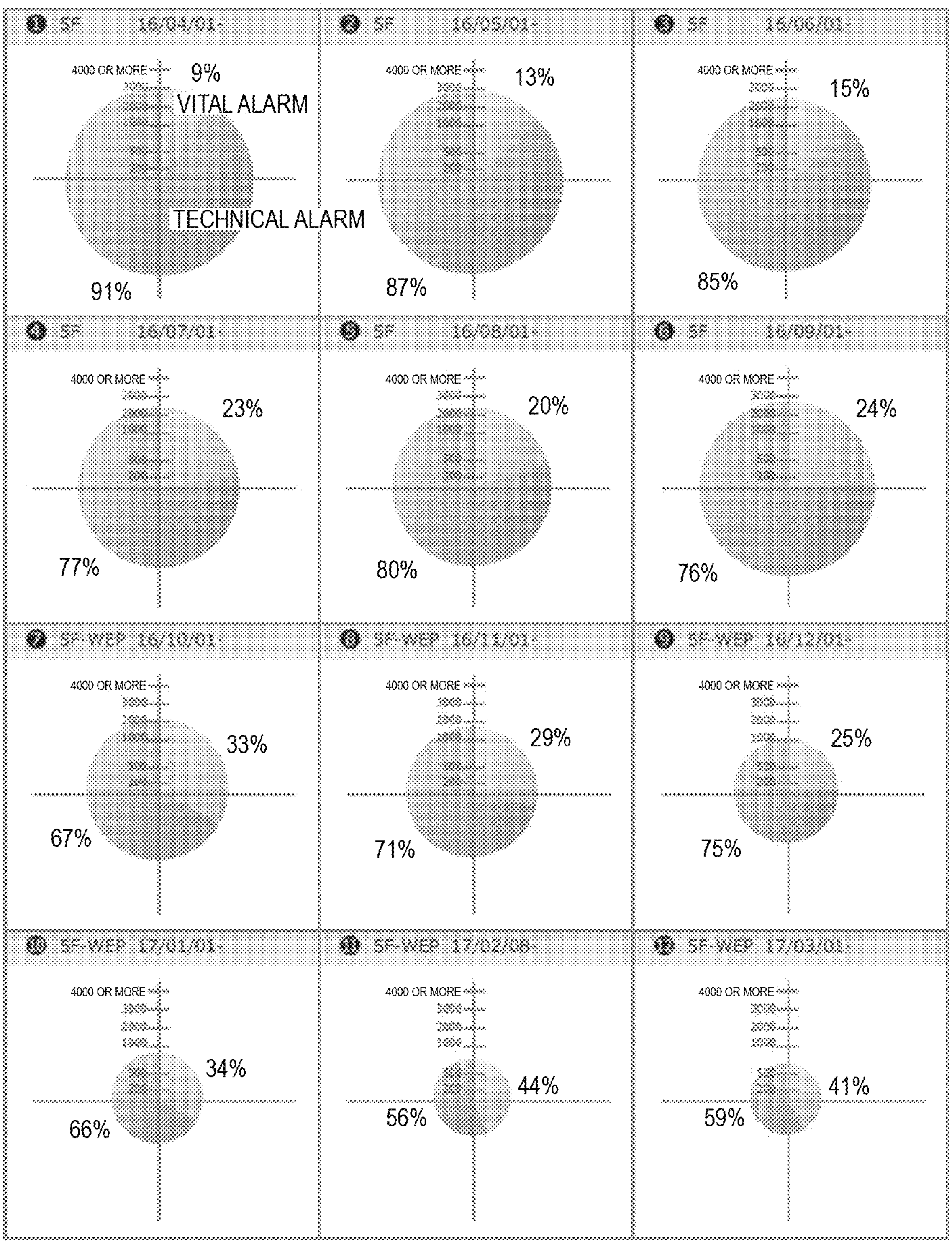
FIG. 14 is a view illustrating an output form 1 of "transition of the number of alarms per day" outputted by the output.

FIG. 14 is an output form 1 of the "transition of the number of alarms per day" outputted by the output 138. Transition of a number of alarms per day at a fifth floor in the own facility is displayed by pie charts corresponding to one year and arranged in chronological order. Each of the pie charts illustrates the number of alarms per day on a monthly basis. The size of a pie in each of the pie charts corresponds to the number of alarms per day. Accordingly, the number of alarms per day is smaller as the size of the pie in the pie chart is smaller. In addition, the numbers of vital and technical alarms per day or the ratios of the numbers of vital and technical alarms with respect to the number of alarms per day are displayed as divided parts of the pie of the pie chart. Accordingly, based on the way the pie of the pie chart is divided, it is possible to roughly grasp the numbers of vital and technical alarms per day or the ratios of the numbers of vital and technical alarms with respect to the number of alarms per day.

FIG. 14 depicts that the pie of the pie chart is smaller from April 2016 toward March 2017. That is, the number of alarms per day decreases gradually so that it can be understood that the countermeasure is successful.

Figure 15:
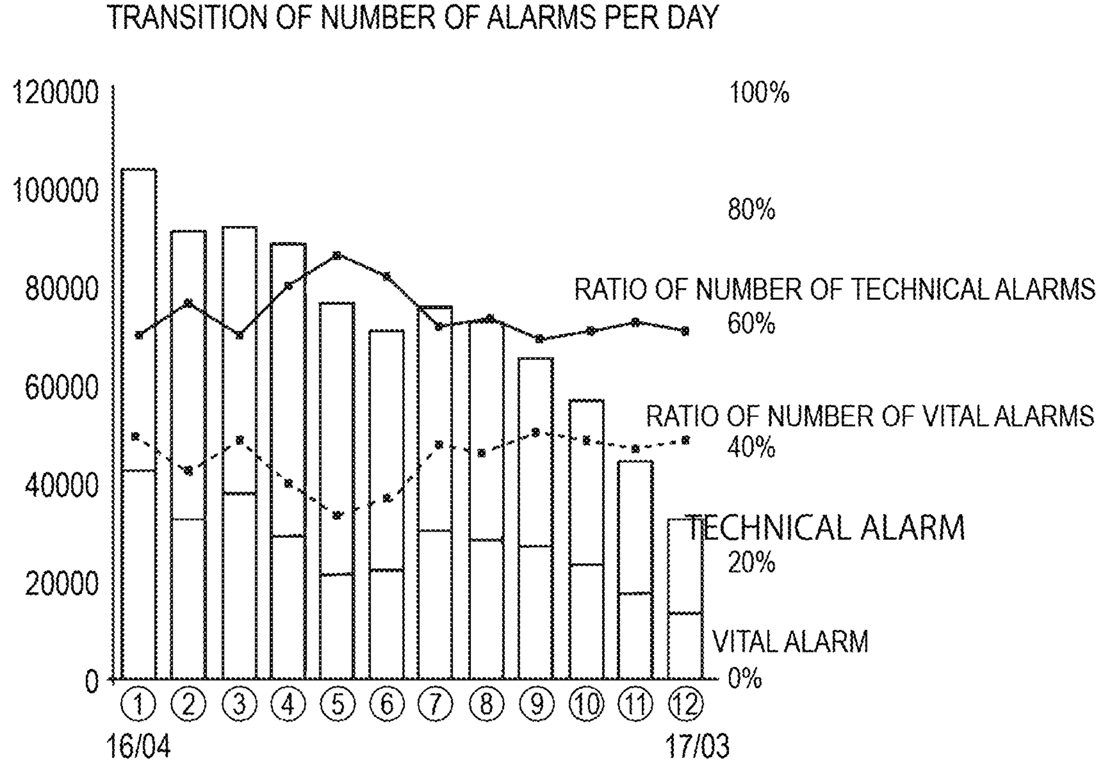
FIG. 15 is a view illustrating an output form 2 of the "transition of the number of alarms per day" outputted by the output.

FIG. 15 is an output form 2 of the "transition of the number of alarms per day" outputted by the output 138. FIG. 15 also illustrates the "transition of the number of alarms per day" like FIG. 14 but is presented in a different manner from FIG. 14. In FIG. 15, the transition of the number of alarms per day is displayed by a bar graph in which bars each indicating the number of alarms per day on a monthly basis are arranged for one year in chronological order. The length of each of the bars in the bar graph corresponds to the number of alarms per day. Accordingly, the number of alarms per day is smaller as the length of the bar of the bar graph is shorter. In addition, the numbers of vital and technical alarms per day are displayed respectively as divided parts of the bar of the bar graph. Further, the ratios of the numbers of vital and technical alarms with respect to the number of alarms per day are displayed by line graphs respectively. By the bar graph and the line graphs, it is possible to grasp yearly transition of the numbers of vital and technical alarm per day or the ratios of the numbers of vital and technical alarms with respect to the number of alarms per day.

FIG. 15 depicts that the bar graph tends to be lower in height from April 2016 toward March 2017. That is, the number of alarms per day decreases gradually so that it can be understood that the countermeasure is successful. In addition, of the ratios of the numbers of vital and technical alarms, the ratio of the number of vital alarms is larger. Accordingly, it can be known that a countermeasure for suppressing generation of technical alarms is effective in further decreasing the number of alarms per day in the future.

Figure 16:
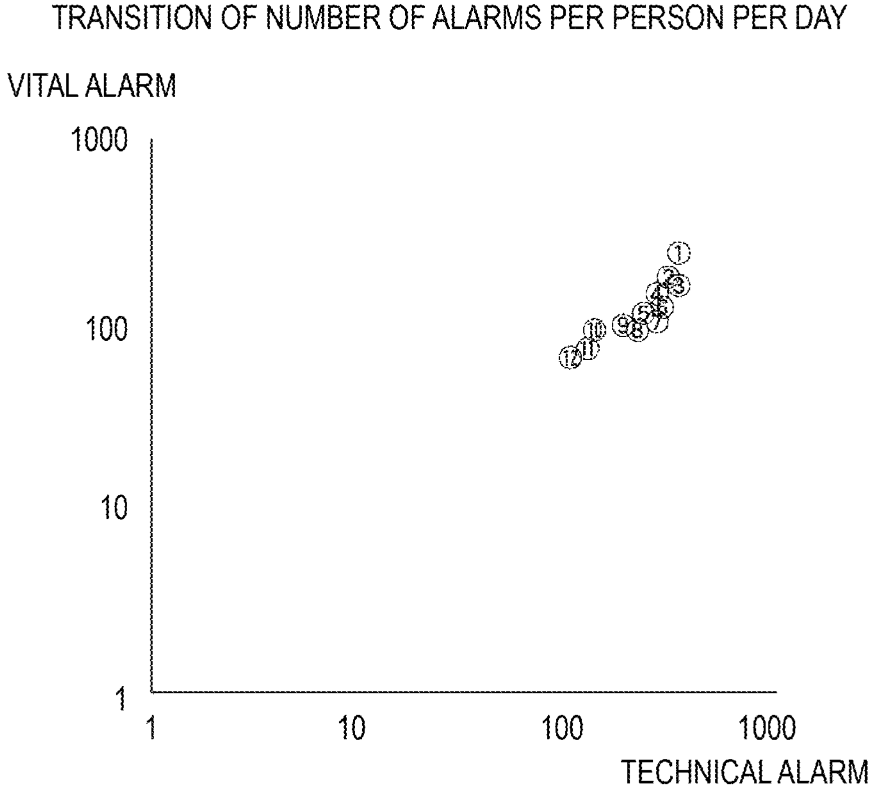
FIG. 16 illustrates an output form of "transition of the number of alarms per person per day" outputted by the output.

FIG. 16 illustrates a display form of the "transition of the number of alarms per person per day" outputted by the output 138. The number of alarms is divided into the number of vital alarms and the number of technical alarms and shown in a logarithmic graph in which the number of vital alarms is set on the ordinate and the number of technical alarms is set on the abscissa. The transition of the number of alarms per person per day is displayed by plotting the number of vital alarms and the number of technical alarms on a monthly basis on a plane.

FIG. 16 depicts that the number of alarms per person per day decreases gradually as the months go by. In addition, it can be known that the number of vital alarms and the number of technical alarms also decrease gradually as the months go by. Accordingly, it can be known that the countermeasure is successful.

Figure 17:
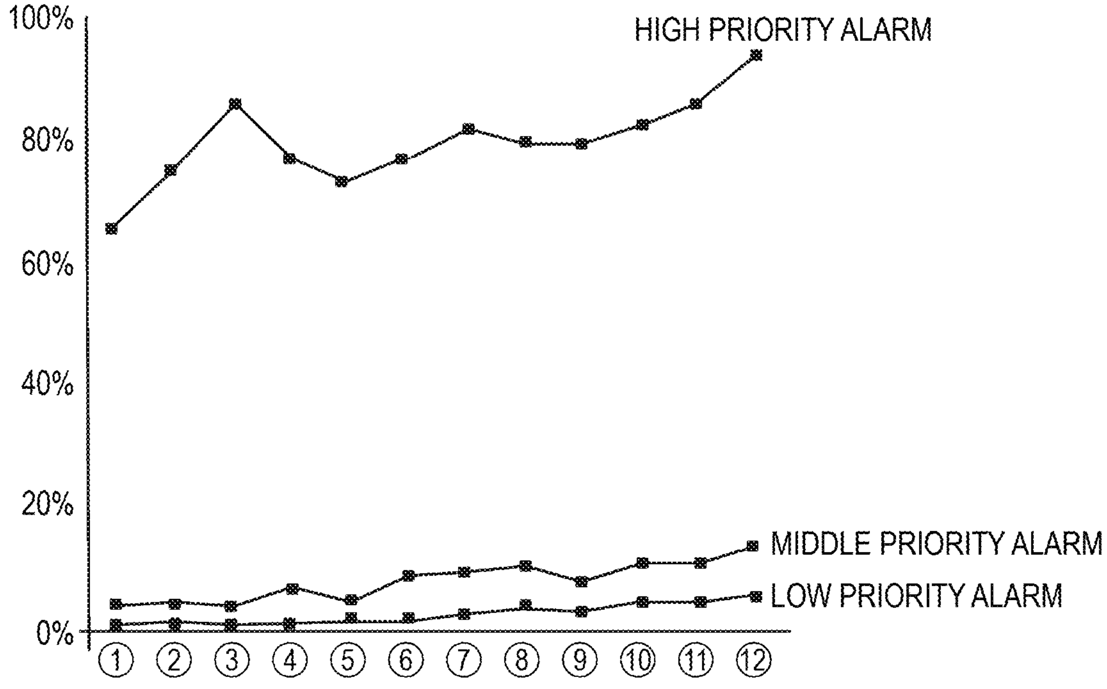
FIG. 17 illustrates an output form of "transition of alarm silence ratios" outputted by the output.

FIG. 17 illustrates an output form of the "transition of the alarm silence ratios". The alarm silence ratios of three alarms, i.e. a high priority alarm, a middle priority alarm and a low priority alarm are represented by line graphs respectively.

FIG. 17 depicts that the high priority alarm silence ratio has increased since three or fourth months ago. Accordingly, improvement in response of the medical staff to the high priority alarm can be seen. In addition, the middle priority alarm silence ratio and the low priority alarm silence ratio are not so good, but also have increased since three or fourth months ago. Accordingly, improvement in response of the medical staff to the middle priority alarm and the low priority alarm can be seen.

Figure 18:
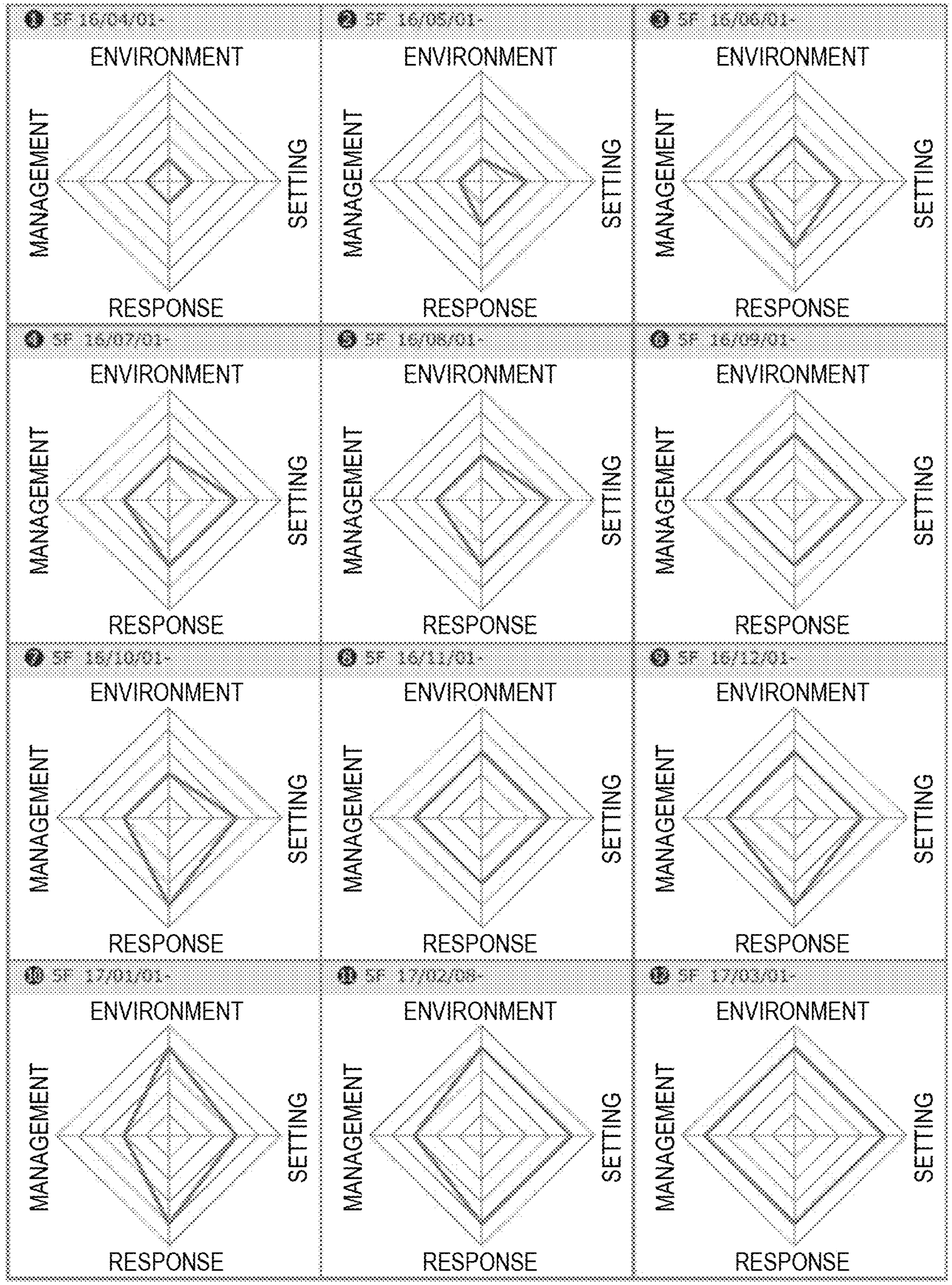
FIG. 18 is a view illustrating an output form of "transition of overall determination" outputted by the output.

FIG. 18 illustrates an output form of the "transition of the overall determination" outputted by the output 138. The transition of the overall determination is displayed by radar charts each of which illustrates overall determination on a monthly basis and which are arranged for one year in chronological order. The overall determination is performed by five-level evaluation, and a threshold is provided between adjacent ones of the levels. The overall determination is more excellent as an area of a square formed by connecting the evaluation levels of four items is larger. Details of each radar chart with the four items "environment", "setting", "response" and "management" for the overall determination have been described in Embodiment 1.

In view of FIG. 18, the area of the square indicating the overall determination increases gradually from April 2016 toward March 2017. Accordingly, from the transition of the overall determination, it can be known that the statistics about alarms in the own facility have been better even in an overall view.

According to the alarm information processing apparatus and the alarm information processing program configured in the aforementioned manner in the embodiment 2, it is possible to output the statistics about alarms from the alarm information of the medical sites. More specifically, according to the embodiment 2, it is possible to see the "transition of the number of alarms per day", the "transition of the number of alarms per person per day", the "transition of the alarm silence ratios", and the "transition of the overall determination" of the own facility for one year. Therefore, it is possible to not only grasp an improvement condition of the statistics about alarms of the own facility but also grasp a direction for the improvement.

The alarm information processing apparatus and the alarm information processing program according to the presently disclosed subject matter have been separated into Embodiment 1 and Embodiment 2 and described above but may be implemented in an integrated mode of Embodiments 1 and 2. That is, the alarm information processing apparatus and the alarm information processing program may be configured so that information about alarms can be compared between the own facility and the other facilities while temporal transition of the statistics about alarms in the own facility can be also grasped.

In Embodiment 1, FIG. 7 to FIG. 11 are illustrated as the specific output forms, but the output forms are not limited to the ones illustrated in these drawings. In addition, in Embodiment 2, FIG. 14 to FIG. 18 are illustrated as the specific output forms, but the output forms are not limited to the ones illustrated in these drawings. It is a matter of course that various output forms may be used if necessary.

Embodiment 1 has been described with an example in which the statistics about alarms is compared between one selected facility (own facility) and other facilities. However, statistics about alarms generated at first Ward and second Ward of the own facility may be compared. Further, statistics about alarms generated at the first Ward of the own facility in different periods of time (e.g. in January and February) may be compared.

Although the case where the alarm information processing apparatus 130 is constituted by one or more computer provided outside the facilities has been illustrated in Embodiment 1 and Embodiment 2, the alarm information processing apparatus 130 may be provided inside one apparatus.

The alarm information processing apparatus and the alarm information processing program according to the presently disclosed subject matter are not limited to the aforementioned embodiments but may be modified into various forms within the scope of their technical ideas.

What is claimed is:

1. An alarm information processing apparatus comprising:

an acquirer that acquires alarm information generated in a predetermined period of time and identification information;

at least one processor configured to:

select first alarm information together with first identification information and second alarm information together with second identification information; and analyze statistics about the first alarm information and the second alarm information, the processor being configured to analyze at least one of a number of alarms per predetermined period of time, a number of alarms per predetermined number of persons per predetermined period of time, and an alarm silence ratio per predetermined period of time, as the statistics about the alarms; and an output configured to output the statistics about alarms analyzed by the processor in a comparable form, wherein the number of alarms per predetermined period of time or the number of alarms per predetermined number of persons per predetermined period of time includes a number of vital alarms each indicating abnormality of vital sign information of a patient, a number of technical alarms each indicating trouble of a medical instrument acquiring the vital sign information, and a total of the number of vital alarms and the number of technical alarms.

2. The alarm information processing apparatus according to claim 1, wherein the alarm silence ratio per predetermined period of time includes at least one of a silence ratio of a low priority alarm lowest in degree of treatment emergency, a silence ratio of a middle priority alarm higher in degree of treatment emergency than the low priority alarm, and a silence ratio of a high priority alarm highest in degree of treatment emergency.

3. The alarm information processing apparatus according to claim 1, wherein the processor is configured to:

compare one facility with another facility or other facilities as the statistics about alarms based on at least one of the number of alarms per predetermined period of time, the number of alarms per predetermined number of persons per predetermined period of time, and the alarm silence ratio per predetermined period of time; and process overall determination of the facility.

4. An alarm information processing method comprising:

acquiring alarm information generated in a predetermined period of time;

selecting first alarm information together with first identification information and second alarm information together with second identification information to thereby analyze statistics about the first alarm information and the second alarm information, at least one of a number of alarms per predetermined period of time, a number of alarms per predetermined number of persons per predetermined period of time, and an alarm silence ratio per predetermined period of time, being analyzed as the statistics about the alarms; and outputting the analyzed statistics about alarms in a comparable form, wherein the number of alarms per predetermined period of time or the number of alarms per predetermined number of persons per predetermined period of time includes a number of vital alarms each indicating abnormality of vital sign information of a patient, a number of technical alarms each indicating trouble of a medical instrument acquiring the vital sign information, and a total of the number of vital alarms and the number of technical alarms.

5. An alarm information processing apparatus comprising:

a processor; and a memory configured to store non-transitory computer readable instructions, wherein when the computer readable instructions are executed by the processor, the alarm information processing apparatus:

acquires alarm information generated in a predetermined period of time;

selects first alarm information together with first identification information and second alarm information together with second identification information to thereby analyze statistics about the first alarm information and the second alarm information, at least one of a number of alarms per predetermined period of time, a number of alarms per predetermined number of persons per predetermined period of time, and an alarm silence ratio per predetermined period of time, being analyzed as the statistics about the alarms; and outputs the analyzed statistics about alarms in a comparable form, and wherein the number of alarms per predetermined period of time or the number of alarms per predetermined number of persons per predetermined period of time includes a number of vital alarms each indicating abnormality of vital sign information of a patient, a number of technical alarms each indicating trouble of a medical instrument acquiring the vital sign information, and a total of the number of vital alarms and the number of technical alarms.

6. An alarm information processing apparatus comprising:

an acquirer that acquires alarm information generated in a predetermined period of time and identification information;

at least one processor configured to:

select first alarm information together with first identification information and second alarm information together with second identification information; and analyze statistics about the first alarm information and the second alarm information, the processor being configured to analyze at least one of a number of alarms per predetermined period of time, a number of alarms per predetermined number of persons per predetermined period of time, and an alarm silence ratio per predetermined period of time, as the statistics about the alarms; and an output configured to output the statistics about alarms analyzed by the processor in a comparable form, wherein the alarm silence ratio per predetermined period of time includes at least one of a silence ratio of a low priority alarm lowest in degree of treatment emergency, a silence ratio of a middle priority alarm higher in degree of treatment emergency than the low priority alarm, and a silence ratio of a high priority alarm highest in degree of treatment emergency.

7. An alarm information processing method comprising:

acquiring alarm information generated in a predetermined period of time;

selecting first alarm information together with first identification information and second alarm information together with second identification information to thereby analyze statistics about the first alarm information and the second alarm information, at least one of a number of alarms per predetermined period of time, a number of alarms per predetermined number of persons per predetermined period of time, and an alarm silence ratio per predetermined period of time, being analyzed as the statistics about the alarms; and outputting the analyzed statistics about alarms in a comparable form, wherein the alarm silence ratio per predetermined period of time includes at least one of a silence ratio of a low priority alarm lowest in degree of treatment emergency, a silence ratio of a middle priority alarm higher in degree of treatment emergency than the low priority alarm, and a silence ratio of a high priority alarm highest in degree of treatment emergency.

8. An alarm information processing apparatus comprising:

a processor; and a memory configured to store non-transitory computer readable instructions, wherein when the computer readable instructions are executed by the processor, the alarm information processing apparatus:

acquires alarm information generated in a predetermined period of time;

selects first alarm information together with first identification information and second alarm information together with second identification information to thereby analyze statistics about the first alarm information and the second alarm information, at least one of a number of alarms per predetermined period of time, a number of alarms per predetermined number of persons per predetermined period of time, and an alarm silence ratio per predetermined period of time, being analyzed as the statistics about the alarms; and outputs the analyzed statistics about alarms in a comparable form, and wherein the alarm silence ratio per predetermined period of time includes at least one of a silence ratio of a low priority alarm lowest in degree of treatment emergency, a silence ratio of a middle priority alarm higher in degree of treatment emergency than the low priority alarm, and a silence ratio of a high priority alarm highest in degree of treatment emergency.

9. An alarm information processing apparatus comprising:

an acquirer that acquires alarm information generated in a predetermined period of time and identification information;

at least one processor configured to:

select first alarm information together with first identification information and second alarm information together with second identification information; and analyze statistics about the first alarm information and the second alarm information, the processor being configured to analyze at least one of a number of alarms per predetermined period of time, a number of alarms per predetermined number of persons per predetermined period of time, and an alarm silence ratio per predetermined period of time, as the statistics about the alarms;

compare one facility with another facility or other facilities as the statistics about alarms based on at least one of the number of alarms per predetermined period of time, the number of alarms per predetermined number of persons per predetermined period of time, and the alarm silence ratio per predetermined period of time; and process overall determination of the facility; and an output configured to output the statistics about alarms analyzed by the processor in a comparable form.

10. An alarm information processing method comprising:

acquiring alarm information generated in a predetermined period of time;

selecting first alarm information together with first identification information and second alarm information together with second identification information to thereby analyze statistics about the first alarm information and the second alarm information, at least one of a number of alarms per predetermined period of time, a number of alarms per predetermined number of persons per predetermined period of time, and an alarm silence ratio per predetermined period of time, being analyzed as the statistics about the alarms;

outputting the analyzed statistics about alarms in a comparable form;

comparing one facility with another facility or other facilities as the statistics about alarms based on at least one of the number of alarms per predetermined period of time, the number of alarms per predetermined number of persons per predetermined period of time, and the alarm silence ratio per predetermined period of time; and processing overall determination of the facility.

11. An alarm information processing apparatus comprising:

a processor; and a memory configured to store non-transitory computer readable instructions, wherein when the computer readable instructions are executed by the processor, the alarm information processing apparatus:

acquires alarm information generated in a predetermined period of time;

selects first alarm information together with first identification information and second alarm information together with second identification information to thereby analyze statistics about the first alarm information and the second alarm information, at least one of a number of alarms per predetermined period of time, a number of alarms per predetermined number of persons per predetermined period of time, and an alarm silence ratio per predetermined period of time, being analyzed as the statistics about the alarms;

outputs the analyzed statistics about alarms in a comparable form;

compares one facility with another facility or other facilities as the statistics about alarms based on at least one of the number of alarms per predetermined period of time, the number of alarms per predetermined number of persons per predetermined period of time, and the alarm silence ratio per predetermined period of time; and processes overall determination of the facility.

* * * * *